United States Patent
Treat et al.

(10) Patent No.: US 9,163,582 B2
(45) Date of Patent: Oct. 20, 2015

(54) CONVERGENT-DIVERGENT GAS TURBINE NOZZLE COMPRISING MOVABLE FLAPS HAVING A VARIABLE THICKNESS IN A LATERAL DIRECTION

(75) Inventors: Christopher Treat, Manchester, CT (US); Christina A. Stenman, Wethersfield, CT (US); Shelton O. Duelm, Wethersfield, CT (US); Alex J. Simpson, Vernon, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 754 days.

(21) Appl. No.: 13/483,499

(22) Filed: May 30, 2012

(65) Prior Publication Data

US 2013/0318978 A1 Dec. 5, 2013

(51) Int. Cl.
*F02K 1/12* (2006.01)
*F23R 3/16* (2006.01)

(52) U.S. Cl.
CPC ............... *F02K 1/1223* (2013.01); *F23R 3/16* (2013.01); *F02K 1/12* (2013.01); *F05D 2300/6033* (2013.01)

(58) Field of Classification Search
CPC ....... F02K 1/1223; F02K 1/12; F02K 1/1207; F02K 1/1215; F02K 1/123; F02K 1/1238; F02K 1/1253; F02K 1/1261; F02K 1/1269; F02K 1/1276; F02K 1/1284; F02K 1/1292
See application file for complete search history.

(56) References Cited

U.S. PATENT DOCUMENTS

| | | | | |
|---|---|---|---|---|
| 2,927,424 A | * | 3/1960 | Hyde | 239/265.39 |
| 3,165,888 A | | 1/1965 | Keon | |
| 3,584,972 A | * | 6/1971 | Bratkovich et al. | 416/229 R |
| 3,612,400 A | | 10/1971 | Johnson et al. | |
| 3,752,225 A | | 8/1973 | Johnson et al. | |
| 3,806,035 A | | 4/1974 | Calder et al. | |
| 4,236,378 A | * | 12/1980 | Vogt | 60/757 |
| 4,878,618 A | * | 11/1989 | Hufnagel | 239/265.39 |
| 4,964,618 A | * | 10/1990 | Kennedy et al. | 256/24 |
| 5,215,256 A | * | 6/1993 | Barcza | 239/265.39 |
| 5,261,605 A | * | 11/1993 | McLafferty et al. | 239/265.35 |
| 5,285,637 A | * | 2/1994 | Barcza | 239/265.35 |
| 5,435,127 A | * | 7/1995 | Luffy et al. | 60/204 |
| 5,463,866 A | | 11/1995 | Klees | |
| 5,797,544 A | * | 8/1998 | Ward | 239/265.37 |
| 5,842,643 A | * | 12/1998 | Lippmeier | 239/265.39 |
| 6,131,362 A | * | 10/2000 | Buecker | 52/842 |

(Continued)

FOREIGN PATENT DOCUMENTS

JP 08144851 6/1996
KR 1020030024390 3/2003

OTHER PUBLICATIONS

International Search Report for PCT Application No. PCT/US2013/040232 completed Feb. 12, 2014.

*Primary Examiner* — William H Rodriguez
(74) *Attorney, Agent, or Firm* — Carlson, Gaskey & Olds, P.C.

(57) ABSTRACT

A liner assembly includes a plurality of flaps arranged about a central axis and operable to move relative to the central axis. Each of the plurality of flaps defines a forward end and an aft end, lateral sides, and an inner surface and an outer surface relative to the central axis. Each of the plurality of flaps has a thickness between the inner surface and the outer surface, and thickness varies in a lateral direction between the lateral sides.

19 Claims, 2 Drawing Sheets

(56) References Cited

U.S. PATENT DOCUMENTS

| | | |
|---|---|---|
| 6,722,037 B2 * | 4/2004 | Nees et al. .................. 29/897.2 |
| 7,555,904 B1 | 7/2009 | Osga et al. |
| 7,624,579 B2 | 12/2009 | Peters |
| 7,730,677 B2 * | 6/2010 | Hansen ........................ 52/204.5 |
| 7,757,477 B2 | 7/2010 | Kehret et al. |
| 8,074,969 B2 * | 12/2011 | Lee et al. ......................... 256/73 |
| 2003/0101731 A1 * | 6/2003 | Burd et al. ....................... 60/796 |
| 2004/0040253 A1 * | 3/2004 | Knokey et al. ............... 52/729.4 |
| 2005/0016527 A1 | 1/2005 | Barger et al. |
| 2005/0060984 A1 | 3/2005 | Prouteau et al. |
| 2007/0234728 A1 | 10/2007 | Peters |
| 2009/0007520 A1 * | 1/2009 | Navon ........................... 52/837 |
| 2009/0072044 A1 | 3/2009 | Kehret et al. |
| 2009/0072490 A1 | 3/2009 | Cowan et al. |
| 2009/0282833 A1 * | 11/2009 | Hessler et al. .................. 60/757 |
| 2009/0313998 A1 | 12/2009 | Senofonte et al. |
| 2010/0310764 A1 | 12/2010 | Arnold et al. |
| 2012/0272654 A1 * | 11/2012 | Kaleeswaran et al. .......... 60/772 |
| 2014/0007534 A1 * | 1/2014 | Shembekar et al. ......... 52/309.8 |
| 2014/0237784 A1 * | 8/2014 | Lacy et al. ..................... 29/17.3 |

\* cited by examiner

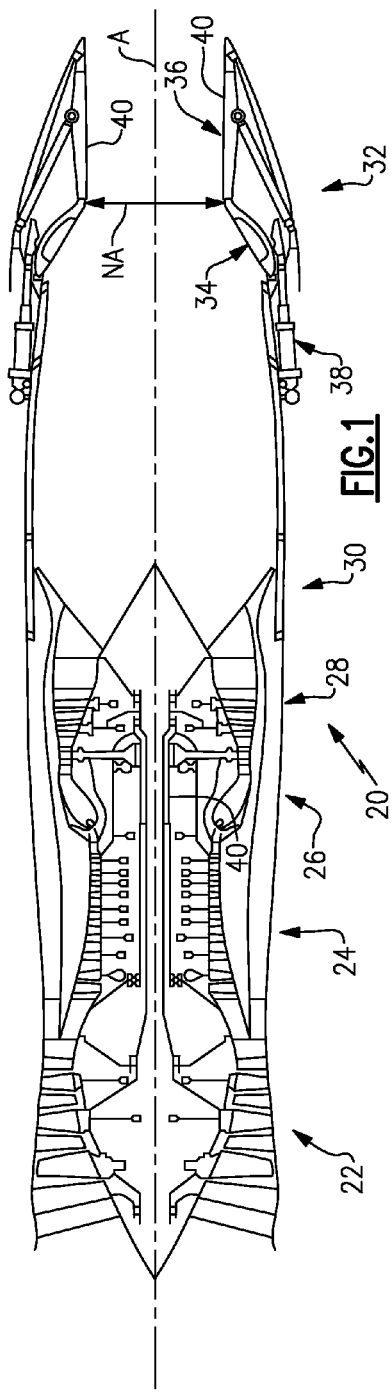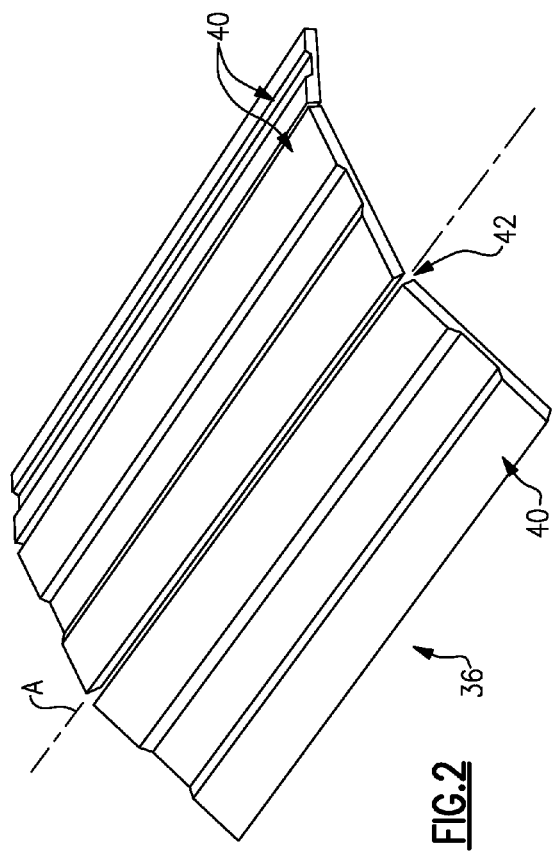

CONVERGENT-DIVERGENT GAS TURBINE NOZZLE COMPRISING MOVABLE FLAPS HAVING A VARIABLE THICKNESS IN A LATERAL DIRECTION

STATEMENT REGARDING FEDERALLY SPONSORED RESEARCH OR DEVELOPMENT

This invention was made with government support under contract number N00019-02-C-3003 awarded by the United States Navy. The government has certain rights in the invention.

BACKGROUND

This disclosure relates to thermal management in a liner assembly, such as a convergent-divergent nozzle.

A gas turbine engine typically includes a fan section that moves air downstream towards a compressor section. The compressor section compresses the air and delivers it into a combustion section for hot combustion gases. The hot combustion gases are delivered downstream to a turbine section and then discharged through a nozzle.

The nozzle may be a convergent-divergent nozzle that is generally known and used to vary a cross-sectional area of the nozzle by moving nozzle flaps that pivot inwardly and outwardly. The nozzle flaps are subject to thermal gradients and thus one challenge in designing nozzle flaps is managing thermal gradients.

SUMMARY

A liner assembly according to an exemplary aspect of the present disclosure includes a plurality of flaps arranged about a central axis and that are operable to move relative to the central axis. Each of the plurality of flaps defines a forward end and an aft end, lateral sides, and an inner surface and an outer surface relative to the central axis. Each of the plurality of flaps has a thickness between the inner surface and the outer surface, the thickness varying in a lateral direction between the lateral sides.

In a further non-limiting embodiment of the above example, each of the plurality of flaps is a ceramic matrix composite having a ceramic matrix and a reinforcement phase dispersed through the ceramic matrix.

The assembly as recited in claim 1, wherein each of the plurality of flaps is an organic matrix composite having an organic matrix and a reinforcement phase dispersed through the organic matrix.

In a further non-limiting embodiment of any of the foregoing examples, each of the plurality of flaps includes at least one respective trough that is elongated in an axial direction with regard to a flap central axis extending between the forward end and the aft end.

In a further non-limiting embodiment of any of the foregoing examples, the at least one trough extends entirely from the forward end to the aft end.

In a further non-limiting embodiment of any of the foregoing examples, the at least one trough is located in a lateral central region of the respective one of the plurality of flaps.

In a further non-limiting embodiment of any of the foregoing examples, each of the plurality of flaps includes a thin section and first and second thick sections, relative to the thin section, that laterally bound the thin section.

In a further non-limiting embodiment of any of the foregoing examples, the thin section has a lateral width w1 in the lateral direction and each of the first and second thick sections has a lateral width w2 in the lateral direction such that a ratio of (w1+w2)/w1 is in a range of 2 to 11.

In a further non-limiting embodiment of any of the foregoing examples, the thin section has a lateral width w1 in the lateral direction and each of the first and second thick sections has a lateral width w2 in the lateral direction such that a ratio of (w1+w2)/w1 is in a range of 3.19 to 6.7.

In a further non-limiting embodiment of any of the foregoing examples, the first and second thick sections are of equal thickness.

In a further non-limiting embodiment of any of the foregoing examples, the first and second thick sections are symmetric with regard to a flap central axis extending between the forward end and the aft end.

A further non-limiting embodiment of any of the foregoing examples includes first and second inclined surfaces, relative to the inner surface and the outer surface, the first and second inclined surfaces joining the respective first and second thick sections with the thin section.

In a further non-limiting embodiment of any of the foregoing examples, the first and second thick sections are symmetric with regard to a flap central axis extending between the forward end and the aft end.

In a further non-limiting embodiment of any of the foregoing examples, each of the plurality of flaps includes a minimum thickness t1 and a maximum thickness t2 such that a ratio of t2/t1 is in a range of 1.4 to 3.

In a further non-limiting embodiment of any of the foregoing examples, each of the plurality of flaps is laterally spaced apart neighboring ones of the plurality of flaps.

In a further non-limiting embodiment of any of the foregoing examples, the inner surface is planar and the outer surface is non-planar.

A liner assembly according to an exemplary aspect of the present disclosure includes a flap defining a forward end and an aft end, lateral sides, and an inner surface and an outer surface, with a thickness between the inner surface and the outer surface. The thickness varies in a lateral direction between the lateral sides.

In a further non-limiting embodiment of any of the foregoing examples, each of the plurality of flaps includes a thin section and first and second thick sections, relative to the thin section, that laterally bound the thin section.

In a further non-limiting embodiment of any of the foregoing examples, the thin section has a lateral width w1 in the lateral direction and each of the first and second thick sections has a lateral width w2 in the lateral direction such that a ratio of (w1+w2)/w1 is in a range of 2 to 11, and wherein each of the plurality of flaps includes a minimum thickness t1 and a maximum thickness t2 such that a ratio of t2/t1 is in a range of 1.4 to 3.

An engine according to an exemplary aspect of the present disclosure includes a compressor section, a combustor section in communication with the compressor section, and a liner in communication with the combustor section. The liner includes a plurality of flaps arranged about a central axis and that are operable to move relative to the central axis. Each of the plurality of flaps defines a forward end and an aft end, lateral sides, and an inner surface and an outer surface relative to the central axis. Each of the plurality of flaps has a thickness between the inner surface and the outer surface, the thickness varying in a lateral direction between the lateral sides.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 shows an example gas turbine engine.

FIG. 2 shows example flaps of a liner assembly, with surrounding structure removed.

DETAILED DESCRIPTION OF THE PREFERRED EMBODIMENT

Figure 3:
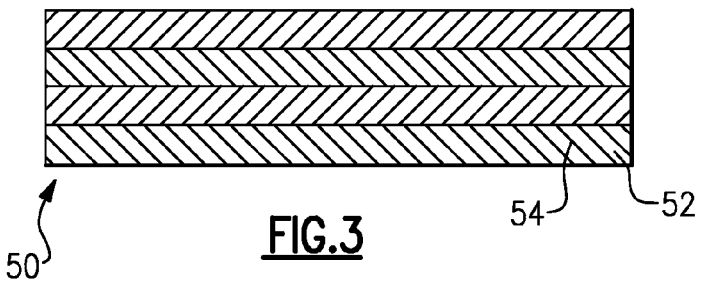
FIG. 3 shows a portion of a composite material used to make a flap of a liner assembly.

FIG. 1 illustrates a gas turbine engine 20. The gas turbine engine 20 disclosed herein is a two-spool turbofan that generally incorporates a fan section 22, a compressor section 24, a combustor section 26, a turbine section 28, an augmenter section 30 and a liner assembly 32, which are arranged about a central engine axis A. Although depicted as an augmented, low bypass gas turbine engine in the disclosed non-limiting embodiment, it should be understood that the concepts described herein are applicable to other gas turbine engines, including geared architecture engines, direct drive turbofans, turboshaft engines and others.

In this example, the liner assembly 32 is shown as an edge-cooled convergent-divergent nozzle assembly in the gas turbine engine 20. It is to be understood, however, that the liner 32 (or flaps 40) disclosed in the examples herein can alternatively be other type of liner assembly or heat shield that is edge-cooled and can be for an engine or other application. The liner assembly 32 generally includes a convergent section 34 and a divergent section 36. As known, an actuator 38 drives a piston to cause the divergent section 36 and the convergent section 34 to move and thereby change a cross-sectional area NA of a throat defined inwardly of the liner assembly 32.

Referring to FIG. 2, the divergent section 36 includes a plurality of flaps 40 that are circumferentially arranged about the central engine axis A. In this example, the flaps 40 are laterally spaced apart from one another such that there is a circumferential gap 42 between neighboring ones of the flaps 40.

In operation, relatively cool air is provided to the circumferential gaps 42 to maintain the flaps 40 at a desired temperature. As will be appreciated, and described in further detail below, the cooling of the flaps 40 from the lateral sides causes a thermal gradient laterally across each of the flaps 40. Thus, each of the flaps 40 is designed for enhanced thermal management, to mitigate thermal stresses caused by such thermal gradients.

FIG. 3 shows a cross-section of a portion of one of the flaps 40. Each of the flaps 40 is made of a composite material 50. In this example, the composite material 50 is a multi-layered structure wherein each layer includes a matrix 52 and a reinforcement phase 54, such as particles or continuous or discontinuous fibers, dispersed within the matrix 52. For example, the composite material 50 is a ceramic matrix composite or an organic matrix composite. In a ceramic matrix composite, the matrix 52 is a ceramic material and in an organic matrix composite, the matrix 52 is an organic material. In particular, flaps that are made of composite materials are somewhat thicker than their metallic alloy counterparts and are thus more vulnerable to the thermal gradients described above.

Figure 4:
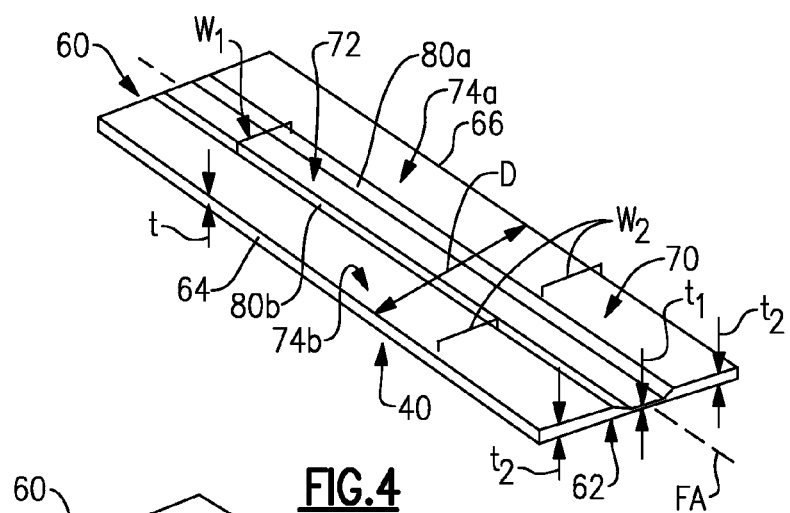
FIG. 4 shows an isolated view of a flap of a liner assembly.

FIG. 4 shows an isolated view of one of the flaps 40, which is representative of each of the flaps 40. Relative to the normal operational flow through the engine 20 and to the central engine axis A, the flap 40 defines a forward end 60 and an aft end 62, lateral sides 64 and 66, and an inner surface 68 (FIG. 5) and an outer surface 70. That is, the inner surface 68 faces inwardly toward central engine axis A and bounds the flow of hot combustion gases through the liner assembly 32.

The flap 40 has a thickness t between the inner surface 68 and the outer surface 70. The thickness t varies in a lateral direction D between the lateral sides 64 and 66.

In this example, the flap 40 includes a trough 72 that functions to mitigate thermal stresses on the flap 40 during operation, such as surface stresses along the length of the flap 40 due to thermal gradients in the lateral direction D. For example, the trough 72 extends entirely from the forward end 60 to the aft end 62 and is located in a lateral central region of the flap 40. That is, the flap 40 spans in the lateral direction D between the lateral sides 64 and 66 and in an axial direction along a flap central axis FA, and the trough 72 is located midway between the lateral sides 64 and 66.

Figure 5:
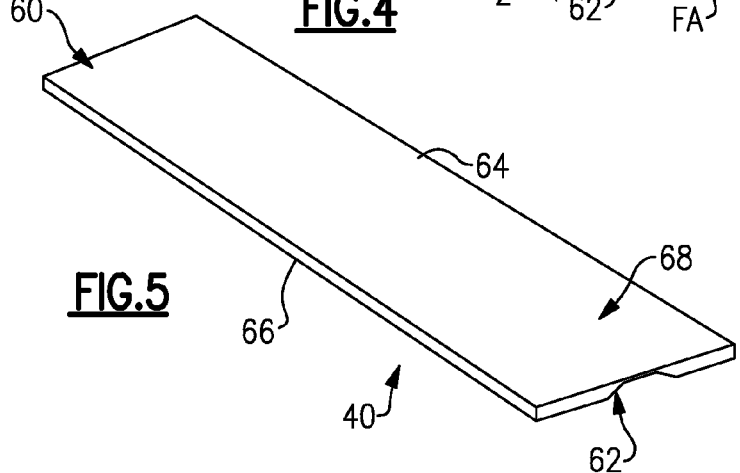
FIG. 5 shows an inner side of the flap shown in FIG. 4.

The trough 72 defines a thin section of the flap 40 and is bounded on each lateral side by relatively thick sections 74a and 74b, which in this example are symmetric about the central axis FA. As shown in FIGS. 4 and 5, the inner surface 68 of the flap 40 is generally planar and the outer surface 70 of the flap is generally non-planar. Thus, the trough 72 is formed in the outer surface 70.

The relatively thin section defined by the trough 72 and the thick sections 74a and 74b are provided with thicknesses and/or lateral widths to ensure proper thermal stress mitigation given the use of the composite material 50. For example, the relatively thin section defined by the trough 72 has a minimum and uniform thickness t1 and the thick sections 74a and 74b each define maximum and uniform thicknesses t2, where the first and second thick sections 74a and 74b are of equal thickness. A ratio of t2/t1 is in a range of 1.4 to 3, and may nominally be 1.75, to ensure proper thermal stress mitigation. In a further example, the thin section has a lateral width w1 in the lateral direction D and each of the first and second thick sections 74a and 74b have a lateral width w2 in the lateral direction D such that a ratio of (w1+w2)/w1 is in a range of 2 to 11. In a further example, the ratio of (w1+w2)/w1 is in a range of 3.19 to 6.7.

In operation, the relatively thin section provided by the trough 72 functions to mitigate thermal stresses caused by the lateral thermal gradient from the cooling provided at the lateral sides 64 and 66 of the flap 40. That is, the relatively thin section provided by the trough 72 decreases stiffness in the central region of the flap 40. The decreased stiffness decreases stress on the colder, first and second thicker sections 74a and 74b. In other words, the relatively thin section provided by the trough 72 provides low resistance to thermal contraction and expansion of the relatively thicker sections 74a and 74b and thus provides a balance of net bending strength while reducing thermal stress.

To further mitigate thermal stresses, the flaps 40 can optionally include first and second inclined surfaces 80a and 80b. The first and second inclined surfaces 80a and 80b are inclined relative to the inner surface 68 and the outer surface 70. The first and second inclined surfaces 80a and 80b join the respective first and second thick sections 74a and 74b with the relatively thin section provided by the trough 72. The first and second inclined surfaces 80a and 80b provide a gradual transition between the relatively thick sections 74a and 74b and the relatively thin section. Thus, there is no abrupt change in thickness that could otherwise act as a stress concentrator for thermal stresses.

Fabrication of the flap 40 can vary, depending upon the type of composite material 50 selected, for example. In one example, a lay-up process is used to stack fibrous layers of the multi-layered structure of the composite material 50 in the shape of the flap 40 as shown in FIGS. 4 and 5. That is, additional layers are provided to fabricate the relatively thick sections 74a and 74b while fewer layers are used to provide the relatively thin section of the trough 72. In an alternative, the flap 40 can initially be made with a uniform thickness and the trough 72 can then be machined into the flap 40.

Figure 6:
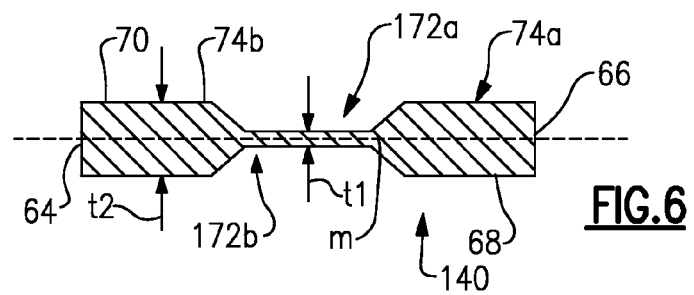
FIG. 6 shows a cross-section of another example flap.

FIG. 6 shows an example of a modified flap 140. In this disclosure, like reference numerals designate like elements where appropriate and reference numerals with the addition of one-hundred or multiples thereof designate modified elements that are understood to incorporate the same features and benefits of the corresponding elements. In this example, the flap 140 is identical to the flap 40 as described above, but includes a first trough 172a defined in the outer surface 70 and a second trough 172b defined in the inner surface 68. The troughs 172a/172b define a thin section of the flap 140 that is bounded on each lateral side by the relatively thick sections 74a and 74b, as described with regard to flap 40. In this example, the troughs 172a/172b are symmetric about a midplane M of the flap 140 between the inner surface 68 and the outer surface 70.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A liner assembly comprising:
   a plurality of flaps arranged about a central axis and that are operable to move relative to the central axis,
   each of the plurality of flaps defining a forward end and an aft end, lateral sides, and an inner surface and an outer surface relative to the central axis, and
   each of the plurality of flaps having a thickness between the inner surface and the outer surface, the thickness varying in a lateral direction between the lateral sides, wherein each of the plurality of flaps includes at least one respective trough that is elongated in an axial direction with regard to a flap central axis extending between the forward end and the aft end.

2. The assembly as recited in claim 1, wherein each of the plurality of flaps is a ceramic matrix composite having a ceramic matrix and a reinforcement phase dispersed through the ceramic matrix.

3. The assembly as recited in claim 1, wherein each of the plurality of flaps is an organic matrix composite having an organic matrix and a reinforcement phase dispersed through the organic matrix.

4. The assembly as recited in claim 1, wherein the at least one trough extends entirely from the forward end to the aft end.

5. The assembly as recited in claim 1, wherein the at least one trough is located in a lateral central region of the respective one of the plurality of flaps.

6. The assembly as recited in claim 1, wherein each of the plurality of flaps includes a minimum thickness t1 and a maximum thickness t2 such that a ratio of t2/t1 is in a range of 1.4 to 3.

7. The assembly as recited in claim 1, wherein each of the plurality of flaps is laterally spaced apart neighboring ones of the plurality of flaps.

8. The assembly as recited in claim 1, wherein the inner surface is planar and the outer surface is non-planar.

9. An engine comprising:
   a compressor section;
   a combustor section in communication with the compressor section; and
   a liner in communication with the combustor section, the liner including a plurality of flaps arranged about a central axis and that are operable to move relative to the central axis, each of the plurality of flaps defining a forward end and an aft end, lateral sides, and an inner surface and an outer surface relative to the central axis, each of the plurality of flaps having a thickness between the inner surface and the outer surface, the thickness varying in a lateral direction between the lateral sides, wherein each of the plurality of flaps includes a thin section and first and second thick sections, relative to the thin section, that laterally bound the thin section.

10. The engine as recited in claim 9, wherein the thin section has a lateral width w1 in the lateral direction and each of the first and second thick sections has a lateral width w2 in the lateral direction such that a ratio of (w1+w2)/w1 is in a range of 2 to 11.

11. The engine as recited in claim 9, wherein the thin section has a lateral width w1 in the lateral direction and each of the first and second thick sections has a lateral width w2 in the lateral direction such that a ratio of (w1+w2)/w1 is in a range of 3.19 to 6.7.

12. The engine as recited in claim 9, wherein the first and second thick sections are of equal thickness.

13. The engine as recited in claim 9, wherein the first and second thick sections are symmetric with regard to a flap central axis extending between the forward end and the aft end.

14. A liner assembly comprising:
   a plurality of flaps arranged about a central axis and that are operable to move relative to the central axis,
   each of the plurality of flaps defining a forward end and an aft end, lateral sides, and an inner surface and an outer surface relative to the central axis, and
   each of the plurality of flaps having a thickness between the inner surface and the outer surface, the thickness varying in a lateral direction between the lateral sides, wherein each of the plurality of flaps includes a thin section and first and second thick sections, relative to the thin section, that laterally bound the thin section.

15. The assembly as recited in claim 14, wherein the thin section has a lateral width w1 in the lateral direction and each of the first and second thick sections has a lateral width w2 in the lateral direction such that a ratio of (w1+w2)/w1 is in a range of 2 to 11.

16. The assembly as recited in claim 14, wherein the thin section has a lateral width w1 in the lateral direction and each of the first and second thick sections has a lateral width w2 in the lateral direction such that a ratio of (w1+w2)/w1 is in a range of 3.19 to 6.7.

17. The assembly as recited in claim 14, wherein the first and second thick sections are of equal thickness.

18. The assembly as recited in claim 14, wherein the first and second thick sections are symmetric with regard to a flap central axis extending between the forward end and the aft end.

19. The assembly as recited in claim 14, further comprising first and second inclined surfaces, relative to the inner surface and the outer surface, the first and second inclined surfaces joining the respective first and second thick sections with the thin section.

* * * * *